United States Patent Office 3,099,522
Patented July 30, 1963

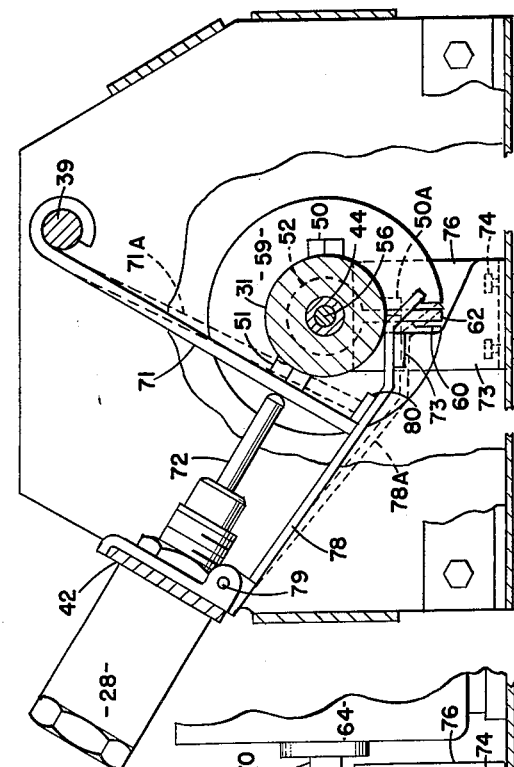
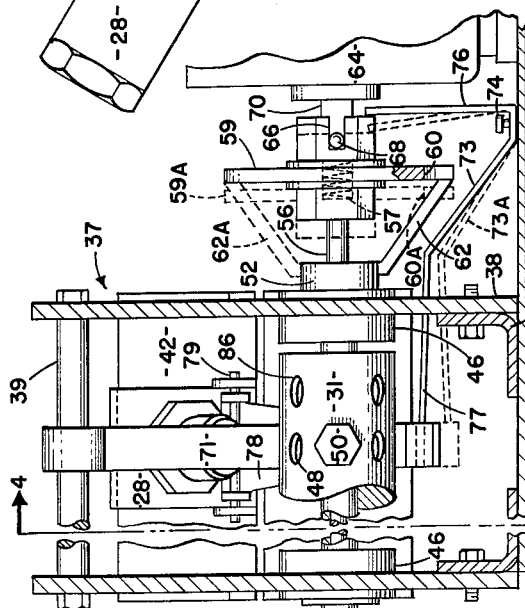
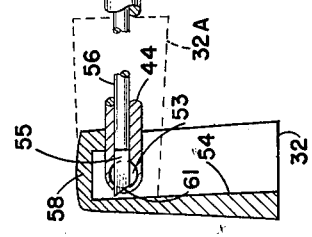
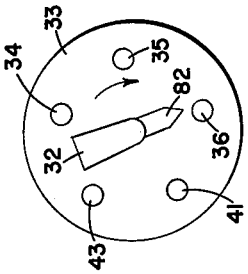
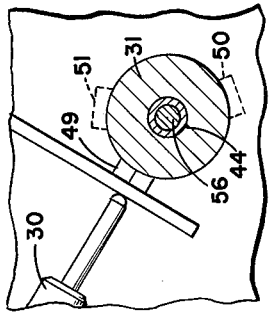
July 30, 1963  N. E. LAUTERBACH  3,099,522
STERILIZER CONTROL APPARATUS
Filed Oct. 28, 1960
*INVENTOR.*
NORMAN E. LAUTERBACH
BY
*ATTORNEYS*

3,099,522
STERILIZER CONTROL APPARATUS
Norman E. Lauterbach, Pittsford, N.Y., assignor to Wilmot Castle Company, Rochester, N.Y., a corporation of New York
Filed Oct. 28, 1960, Ser. No. 65,743
12 Claims. (Cl. 21—94)

This invention relates to apparatus for controlling the flow of sterilants to a sterilizing chamber.

This invention more particularly relates to automatically and manually controllable apparatus for selectively controlling the flow of sterilants under pressure to the sterilizing chamber or sterilants being pulsed into the chamber.

Recent advances in the art of sterilizers has provided an arrangement for intermittently supplying steam or other sterilant to the sterilizing chamber through a solenoid valve or other automatically controlled valve, responsive to the temperature in the chamber or of the load. This has presented the problem of being able to supply the sterilant directly to the chamber in the event of power failure whereby the automatic temperature controlled solenoid valve pulsing sterilant into the chamber is rendered ineffective to carry out its intended function.

To accomplish the above purposes, it is necessary to provide a bypass line to supply steam or other sterilant directly from a source to the sterilizing chamber. Likewise, it has been necessary to provide means for switching from automatic control to manual control and to provide means for manually opening a valve for controlling the bypass line.

It is one object of my invention to provide a simple and convenient means for switching from automatic control to manual control of a sterilizer.

It is a further object of my invention to provide a simple and convenient manually and automatically controlled system of supplying steam or other sterilant to the sterilizing chamber.

Another object of my invention is the provision of a single dual controller combining an automatic sterilizer control for a sterilizer having a device for automatically pulsing steam into the chamber and a manual sterilizer control for manually supplying steam to the chamber only when the automatic control is rendered ineffective.

It is a significant object of my invention to provide a safety feature in a sterilizer whereby steam or other sterilant may be manually supplied to the sterilizing chamber in the event of power failure or electrical equipment failure.

It is a further significant object of my invention to provide a safety feature whereby a sterilizer is always automatically controlled unless electric power to a dual controller is cut off.

Other objects and advantages of this invention will be particularly set forth in the claims and will be apparent from the following description, when taken in connection with the accompanying drawings, in which:

FIG. 1 is a diagrammatic drawing illustrating the preferred arrangement of the supply lines for steam or other sterilant to a sterilizing chamber;

FIG. 2 is a front elevation of a selector dial for the illustrated embodiment of my invention;

FIG. 3 is a partial side elevation partly in section with parts broken away of the dual controls for automatically and manually controlling the flow of steam or other sterilant indicated in FIG. 1;

FIG. 4 is a sectional view taken substantially on the line 4—4 of FIG. 3 looking in the direction indicated by the arrows; and FIG. 5 is a fragmentary view of a second valve positioned at a point removed from the valve shown in FIG. 4 and the cam shaft 31 shown in section.

Referring to FIG. 1, I have illustrated a sterilizer, generally indicated by the numeral 10, having a sterilizing chamber 12 and a heating jacket 14. The chamber 12 has an exhaust outlet 16 and a condensation trap 18. The heating jacket 14 is provided with a condensation trap 20.

Steam under pressure is supplied through a common line 22 forking into two steam lines which supply steam respectively through a pressure regulator 24 to a valve 28 and through a solenoid valve 26 to valve 30. The direction of steam flow is indicated by the arrows. It will be understood from FIG. 1 that when steam passes through solenoid valve 26 and valve 30 is open, then steam is admitted into both the chamber 12 and jacket 14. When steam passes through pressure regulator 24 and valve 28 is open, steam is supplied only to the jacket 14. When steam passes through regulator 24 and both valves 28 and 30 are open, steam is furnished to both the chamber 12 and jacket 14.

The manner in which solenoid valve 26 is controlled does not constitute a part of this invention. Therefore, it will only briefly be stated that this valve is controlled by a thermostatic device in the chamber 12 so that steam or other sterilant is pulsed into the jacket 14 and chamber 12, thereby to bring the chamber and load to be sterilized up to the selected sterilizing temperature and maintain the selected sterilizing temperature during an automatic cycle of sterilization.

Such a method of supplying sterilant to a sterilizer, however, necessitates bypass provided through pressure regulator 24 to supply sterilant to the chamber 12 and jacket 14 in the event of power failure or electrical equipment failure.

In FIG. 1, I have diagrammatically indicated a cam shaft 31 described more in detail with regard to FIGS. 2 and 3. This cam shaft effectively controls valves 28 and 30. The right end of cam shaft 31 is provided with a handle 32 mounted to pivot between a vertically disposed position shown in solid lines in FIG. 3 and a horizontally disposed position shown in broken lines at 32A in FIG. 3.

I have illustrated a control panel at 33 in FIGS. 1 and 2 having five equally spaced positions indicating five automatically and manually selected positions of the cam shaft 31 which are 72° angularly displaced from each other. FIG. 2 shows an "off" position at 34, a "preheat" position at 35, a "sterilize" position at 36 and two terminal positions at 41 and 43. The number of selective positions to which the cam shaft 31 may be rotated is not significant to my invention. The significance of these particular positions to the described embodiment of my invention will become apparent in the following description with regards to FIGS. 3 and 4.

I shall now describe the preferred structure of a dual controller by which at least the two valves 28 and 30 are controlled to effect the desired valving arrangement when the cam shaft 31 is controlled automatically and manually. With reference to FIGS. 3 and 4, the cam shaft 31 is rotatably mounted in a frame generally indicated by the numeral 37 comprising a plurality of vertical support members 38, horizontal support and tie members 39 and angle members 40 rigidly mounted together. Valve 28 is angularly supported on a cross member 42 which in turn is rigidly mounted on the frame 37 in the manner shown in FIG. 4. It will be understood from FIG. 5 that valve 30 is mounted on the frame 37 in the same mode as valve 28 and is controlled by cams mounted on shaft 31 just as will be described with regard to valve 28.

For each valve to be controlled such as 28 and 30, shaft 31 is provided with five equally spaced radial threaded bores 48 corresponding to control panel positions 34, 35, 36, 41 and 43. These bores are adapted to receive threaded cam members such as indicated at 50 and 51 for valve 28. Like threaded bores and cam members are provided opposite valve 30 and any other valves to be controlled by shaft 31, it being understood that the cam members are selectively threaded into the bores to provide the desired sequence of opening and closing of the valves controlled thereby.

Cam shaft 31 is rigidly mounted on a somewhat smaller diameter hollow shaft 44 rotatably mounted in bushings as indicated at 46 which in turn are rigidly mounted to vertical frame members 38.

The right end of hollow shaft 44 (FIG. 3) is provided with a male clutch member 52 rigidly mounted thereon. The handle 32 is pivotally mounted on the left end of hollow shaft 44 by two pivot bolts, the inner end of one being indicated at 53. It will be understood that the handle 32 is provided with a slot 54 adapted to receive the shaft 44 when in the horizontally disposed position indicated in broken lines at 32A.

A round push rod 56 is slidably mounted in the hollow bore of shaft 44 and in a bore provided through male clutch member 52. Push rod 56 has two flat portions 55 at the left end thereof which are engaged by the innermost ends of pivot bolts one of which is shown at 53, thereby keying the rod 56 to the handle 32. This keying arrangement is designed to maintain a shaped cam surface 61 at the left end of rod 56 in proper registry with a cam surface 58 provided internally of the handle 32 and constituting a portion of the contour of the slot 54. It is understood that the left end 61 of rod 56 extends beyond hollow shaft 44 to enable camming thereof. The cam surfaces 58 and 61 are so designed that a horizontal force applied to rod 46 by a compression spring 57 tends to cam the handle 32 to the horizontally disposed position at 32A.

In operation, when the handle 32 is moved from the horizontally disposed position 32A in which the cam shaft 31 is automatically controlled to the vertically disposed position in which shaft 31 is manually controlled by rotating handle 32, the push rod 56 is cammed to the right in opposition to spring 57. In turn, a female clutch plate 59, slidably keyed to a motor drive shaft 70, is cammed from the broken line position shown at 59A to the solid line position. The camming of the rod 56 to the right withdraws a slot or opening 60, provided in clutch plate 59, from the position shown in broken lines at 60A where it receives an extension or tongue 62 of male clutch member 52.

Clutch plate 59 is coupled to a motor 64 by a transverse slot 66 slidably receiving a pin 68 extending transversely through the motor drive shaft 70 controlled by the motor 64.

The tongue 62 slidably engages plate 59 in opposition to spring 57, thereby to maintain clutch plate 59 in the solid line position shown in FIG. 3 and prevent rod 46 from camming handle 32 to the horizontally disposed automatic position 32A. At 62A I have illustrated in broken lines the position of the tongue after it has been manually turned 180°. When tongue 62 is brought into registry with slot 60, the force of spring 57 actuates the female clutch plate 59 to the left to position 59A and the rod 56 to the left and handle 32 is cammed to position 32A. In the latter position, the motor 64 once again controls the movement of cam shaft 31.

Motor 64 is automatically controlled by an electrical circuit (not shown) including a timer (not shown) and switches (not shown) which are actuated by cams mounted on cam shaft 31. Thus, motor 64 is controlled in a manner so the clutch plate 59 turns clockwise, as viewed in FIG. 4, until slot 60 registers with tongue 62. Then motor 64 automatically rotates the cam shaft 31 clockwise to the next position and continues its automatic cycle.

This invention guarantees that when used with a motor controlled in the manner described above, the valves 28 and 30 will be automatically controlled by the automatic cycle of the motor 64 unless the power of the motor is cut off. Therefore, a switch (not shown) is included in the circuit controlling the motor 64, thereby enabling uninterrupted manual control of the cam shaft 31.

In the event of power failure, it will be understood that if the switch (not shown) in the motor circuit (not shown) is not open, the motor will automatically pick up control of the cam shaft 31 after power is restored.

Handle 32 is automatically rotated only in a clockwise direction as indicated in FIGS. 2 and 4, thereby moving cam shaft 31 to selected positions for selected periods of time, during which timed periods cams on shaft 31 are effective to open or close one or more of valves 28, 30, and other selected control valves.

As will be understood from the following description of apparatus for locking valve 28 in an open position during manual operation of the cam shaft 31, no parts are damaged by manually rotating the shaft 31 in either direction. However, it is necessary to manually rotate the handle 32 and cam shaft 31 in a clockwise direction in order to open the valves in the correct sequence and in order to lock valve 28 in the open position when the cam shaft is in the sterilize position 36.

I shall now describe that portion of an automatic cycle of the illustrated sterilizer which involves the preheat position 35 and sterilize position 36 (see FIG. 2). When the handle is in the automatic horizontally disposed position 32A so that the female clutch plate 59 receives the tongue 62 actuation of the motor 64 automatically rotates the cam shaft 31 and handle 32 from the off position 34 (FIG. 2) to the preheat position 35 and the cam 51 is thereby brought into the position illustrated in solid lines in FIG. 4. The cam 51 engages a striker arm 71 and rotates it clockwise about its pivotal connection with horizontal support member 39, in turn actuating a plunger 72 whereby valve 28 is opened to permit passage of sterilant therethrough. In this position, steam is supplied to the jacket 14 only.

After the motor 64 has rotated the cam shaft 31 clockwise 72° to the sterilize position indicated at 36 in FIG. 2, the striker arm 71 drops off of the cam 51 and engages that portion of the cam shaft intermediate and below the cams 50 and 51, thereby closing the valve 28. This position of the striker arm is shown at 71A in broken lines in FIG. 4. Valve 28 must be closed during the sterilizing portion of the automatic cycle to prevent steam being supplied continuously through the pressure regulator 24 to the chamber 12. During automatic sterilization, a system controlling solenoid valve 26 provides accurate temperature control for the chamber 12.

With reference to FIG. 5, the cam 49 is provided on cam shaft 31 at the position corresponding to the sterilize position 35 to open valve 30 in the same manner as described for valve 28. The solenoid valve 26 is simultaneously actuated to pulse steam into both the jacket 14 and the chamber 12 during sterilization of the goods placed in the chamber 12. Depending on which one of two automatic cycles is selected, the cam shaft 31 is rotated, after complete sterilization, clockwise an additional 72° to terminal position 41 or 144° to terminal position 43. If the selected cycle includes stopping the shaft 31 at position 43, the cam 50 engages the striker arm 71 opening the valve 28. In the latter position steam is admitted into the jacket only during exhaust of the sterilizing chamber 12.

I shall describe the necessary apparatus for admitting steam to the chamber 12 from pressure regulator 24. I have provided a resilient lever 73 (FIGS. 3 and 4) loosely mounted by bolts 74 to the bottom of the frame 37. The resilient lever 73 is provided with a vertically extending arm 76 which engages and is controlled by the female clutch member 57 as indicated in FIG. 3, thereby transmitting angular displacement to the left hand horizontally disposed end 77 of the resilient lever 73, as indicated in solid and broken line in FIG. 3. The left end 77 of the lever 73 is adapted to control a latching or locking member 78 pivotally mounted on a pin 79, in turn rigidly mounted on the frame 37. Latching member 78 is provided with a block or latch 80 rigidly mounted thereon and adapted to engage the striker arm 71 when in the solid line position shown in FIG. 4. The weight of the latching member 78 and latch 80 mounted thereon is effective to return the resilient lever to the broken line position 73A, when handle 32 and clutch plate 59 are returned to their automatic positions shown in broken line in FIG. 3.

I shall now describe a manually selected and operated cycle of the illustrated sterilizer during which the handle 32 is in the vertically disposed position shown in solid line in FIG. 3. In the vertical position, the handle provides a convenient lever for the manual operator to move the handle and a selector pointer 82 (FIG. 2) to the desired positions indicated on the control panel 33. When the handle 32 is moved into the vertically disposed position, the female clutch plate 59 is cammed to the right as shown in the solid line position in FIG. 3. The resilient lever is pivoted from the broken line position 73A to the solid line position indicated in FIG. 3. The resilient lever 73 in turn elevates and pivots the latching or locking member 78 from the broken line position shown at 78A to substantially the solid line position shown at 78 in FIG. 4. When the cam shaft 31 is rotated to the preheat position indicated at 35 in FIG. 2, the cam 51 engages the striker arm 71 opening the valve 28 admitting heat into the jacket 14 just the same as during the automatic cycle. However, the striker arm is locked in the solid line position in FIG. 4 by the latch 80 engaging it. Thus, when handle 72 is rotated an additional 72° clockwise to the sterilize position indicated on the control panel at 36, the valve 28 is maintained in an open position by the latching member 78 and latch 80. It will be understood that in the manually controlled sterilize position, valve 30 is also open thereby permitting the passage of steam through the pressure regulator 24 to both the jacket 14 and the chamber 12.

In the illustrated embodiment of my invention, it will be understood that when the operator manually moves the handle 32 and control shaft 31 clockwise out of the sterilize position, to either of the terminal positions 41 or 43, that cam 50 will be rotated to the broken line position at 50A to thereby disengage the latch 80 from the striker arm 71. This permits the striker arm to drop down and engage the camshaft 31 and close the valve 28.

Just as in the case of the automatic cycle, there are two terminal positions 41 and 43 which provide the same valving arrangement when manually selected as when automatically selected.

Thus, I have provided a unique and novel control means in the sterilizer construction for admitting electrically pulsed steam into the sterilizing chamber 12 during an automatic cycle and control means which in the alternative admit steam through pressure regulator or other control means to the chamber when manually operated.

It will be understood that I do not intend to narrow the concept of my invention to the specific embodiment. A number of mechanical arrangements could be provided for accomplishing the same function, such as to provide a second set of cams for each valve to be controlled as illustrated by the threaded bores 86 adapted to receive cams which would control the valves 28 and 30 in the same manner as described above for manual operation. It will be understood that push rod 56 and cam shaft 31 would be keyed so that the shaft 31 would move longitudinally, thereby bringing the second set of cams into a controlling position for manual operation.

While I have described and shown the preferred form of mechanism of my invention, it will be apparent that various modifications and changes may be made therein, in addition to those specifically pointed out above, particularly in the form and the relation of parts without departing from the spirit of my invention as set forth in the appended claims.

I claim:

1. Control apparatus in a sterilizer construction having means for continuously supplying fluid from a source under pressure to a sterilizing chamber and means for pulsing fluid from a source into said chamber comprising, in combination, a first means for controlling said pulsing means, a second means for controlling said continuous supply means, a third control means having a sterilize position and being adapted for manual and automatic control, said third control means actuating said first control means when in said sterilize position and being automatically controlled, and said third control means actuating said second control means when in said sterilize position and being manually controlled.

2. Apparatus in accordance with claim 1 in which said third control means includes means responsive to automatic control thereof for rendering said third control means effective to actuate said first control means when in said sterilize position and responsive to manual control thereof for rendering said third control means effective to actuate said second control means.

3. Control apparatus in a sterilizer construction having means for continuously supplying fluid from a source under pressure to a sterilizing chamber and means for pulsing fluid from a source into said chamber comprising, in combination, first valve means intermediate said pulsing means and said chamber, second valve means intermediate said continuous supply means and said chamber, cam means having a sterilize position, drive means for automatically driving said cam means to said position, clutch means having an automatic position for interconnecting said cam means and drive means and having a manual position for disconnecting said cam and drive means, and means responsive to said clutch means in said automatic position for rendering said cam means when in the sterilize position effective to open said first valve means and responsive to said clutch in said manual position for rendering said cam means when in the sterilize position effective to open said second valve means.

4. Apparatus in accordance with claim 3 in which said second valve means is intermediate said continuous fluid supply means and a sterilizer heating jacket surrounding said chamber and said first valve means is intermediate said second valve means and said chamber, said cam means also having a preheat position for opening said second valve means and in which said third means includes locking means for maintaining said second valve means open when said cam means is manually moved from said preheat to said sterilize position.

5. Control apparatus in a sterilizer construction comprising, in combination, first means for controlling fluid being pulsed from a source to said chamber, second means for controlling fluid flowing continuously from a source to a sterilizer chamber, control means having a sterilize position and being adapted for manual and automatic control, said control means actuating said first means when in said sterilize position and being automatically controlled, and said control means actuating said second means when in said sterilize position and being manually controlled.

6. Apparatus in accordance with claim 5 wherein said control means includes cam means for actuating said first and second means, drive means for driving said cam means, a clutch intermediate said cam and drive means, and means for disengaging said clutch when said control means is in said manual position.

7. Control apparatus in a sterilizer construction having a second valve controlling the flow of sterilizing fluids from a continuous source to a sterilizer heating jacket and a first valve controlling the flow of sterilizing fluids from said second valve and a source of pulsating steam, comprising, in combination, selector means adapted for automatic and manual control having at least preheat and sterilize positions for opening said second valve when in said preheat position and opening said first valve when in said sterilize position, drive means for automatically moving said selector means from said preheat position to sterilize position, interconnecting means for engaging and disengaging said drive means with said selector means, means for manually moving said selector means from preheat position to sterilize position when disengaged from said drive means, locking means responsive to said interconnecting means for maintaining said second valve open when said selector means is disengaged from said drive means after being manually moved from said preheat to sterilize positions and while said selector means remains in said sterilize position.

8. Control apparatus in a sterilizer construction having first and second valves controlling the flow of sterilizing fluids to said sterilizer comprising, in combination, rotatable cam shaft having at least preheat and sterilize positions, drive means for automatically rotating said cam shaft to said preheat and sterilize positions, clutch means for engaging and disengaging said drive means from said cam shaft, means for manually rotating said cam shaft, a first cam positioned on said shaft to open said second valve when said shaft is in said preheat position, a second cam positioned on said shaft to open said first valve when said shaft is in said sterilize position and valve locking means responsive to said clutch means for maintaining said second valve open when said shaft is disengaged from said drive means after being moved between preheat and sterilize positions and while in said sterilize position.

9. Apparatus in accordance with claim 8 wherein said valve locking means comprises, actuator means actuated by said first cam for opening said second valve and latch means responsive to said clutch means for locking said actuator means and second valve open when said shaft is manually rotated to and remains in said sterilize position, and including release means for disengaging said latch means from said actuator means thereby permitting closure of said second valve after said shaft is rotated out of said sterilize position in the direction opposite said preheat position.

10. Apparatus in accordance with claim 8 wherein said valve locking means comprises, a striker arm pivotally mounted intermediate said shaft and said second valve, said striker arm being actuated by said first cam to open said second valve, a latch responsive to said clutch and being pivotally mounted to control said striker arm and hold said second valve open when said shaft is manually rotated from said preheat to said sterilize position, and means for unlocking said latch and striker arm when said shaft is manually rotated out of said sterilize position in the direction opposite said preheat position.

11. Sterilizer control apparatus comprising, in combination, cam means movable over a predetermined path and having a sterilize position, first control means actuated by said cam means when in said sterilize position, automatic means for advancing said cam means in sequential operation to said sterilize position, manual means for disengaging said automatic means and for manually advancing said cam means to said sterilize position, second control means, and means responsive to said manual means and cooperative with said cam means for actuating said second control means when said cam means is in said sterilize position.

12. Control apparatus comprising, in combination, cam means movable over a predetermined path and having a selective position, first control means actuated by said cam means when in said position, automatic means for advancing said cam means to said position during sequential operation of said cam means, manual means for disengaging said automatic means and for manually advancing said cam means to said position, second control means, and means responsive to said manual means for actuating said second control means when said cam means is in said position.

References Cited in the file of this patent
UNITED STATES PATENTS

| | | |
|---|---|---|
| 1,612,752 | Talas | Dec. 28, 1926 |
| 2,925,988 | Ray | Feb. 23, 1960 |
| 2,932,307 | Bydalek | Apr. 12, 1960 |
| 2,932,978 | Newberry | Apr. 19, 1960 |
| 2,946,346 | Mead | July 26, 1960 |